April 26, 1966   W. R. BRYANT ETAL   3,247,552
MOISTURIZER
Filed Aug. 30, 1963   2 Sheets-Sheet 1
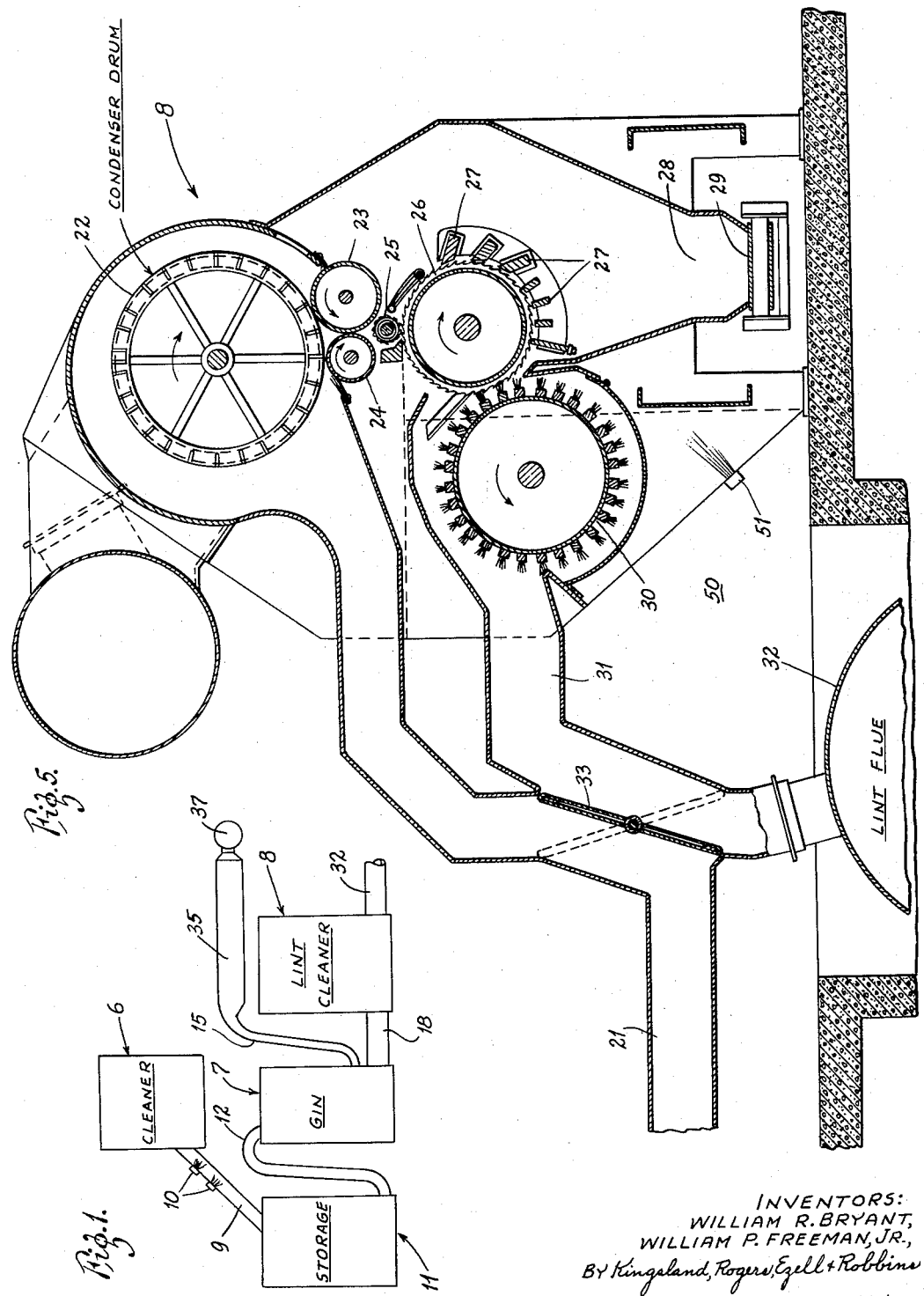
INVENTORS:
WILLIAM R. BRYANT,
WILLIAM P. FREEMAN, JR.,
BY Kingsland, Rogers, Ezell & Robbins
ATTORNEYS

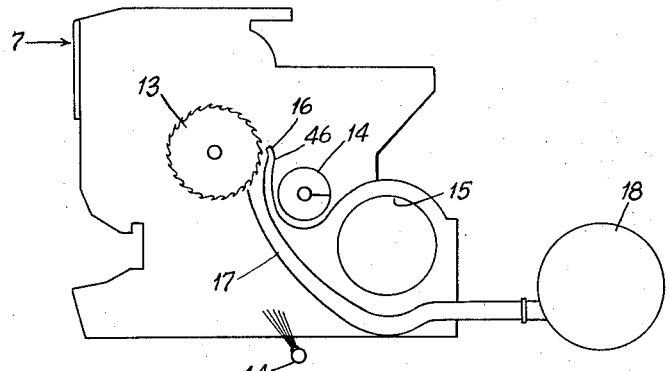
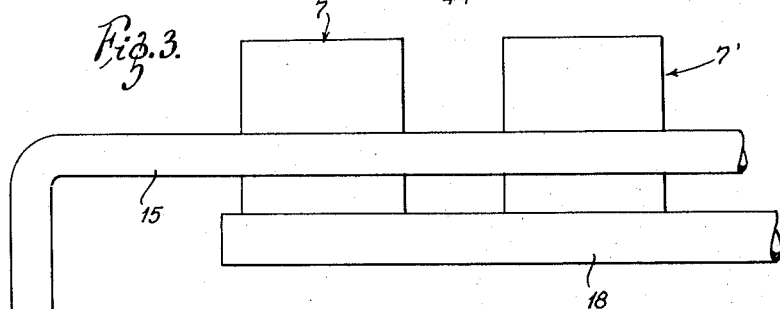
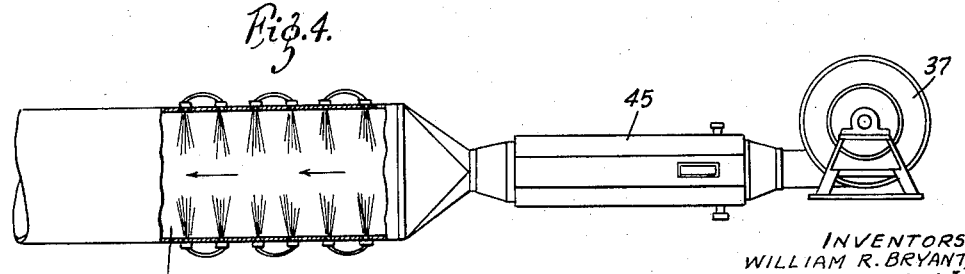

3,247,552
MOISTURIZER
William R. Bryant, 828 Strawn St., Jonesboro, Ark., and William P. Freeman, Jr., 6118 Brandeis Lane, Dallas, Tex.
Filed Aug. 30, 1963, Ser. No. 305,752
4 Claims. (Cl. 19—66)

This invention relates to the moisturizing of cotton during the ginning process to improve the quality of the lint cotton. It has been known for many years that some manner of adding moisture to cotton is desirable. More recently, Wm. R. Bryant discovered (applications for United States patents, Serial Nos. 11,265 and 91,165, filed February 26, 1960, and February 23, 1961, respectively, now U.S. Patents Nos. 3,114,175 and 3,114,938) that an effective moisture restoration in relatively dry clean cotton can be achieved by adding moisture to the cotton and then storing the cotton for a period of time before feeding it into the high speed ginning machinery for separation of the cotton lint from the cotton seed. These recent efforts of Mr. Bryant have actually produced an increase in the moisture content of cotton from the relatively low value the cotton had when picked, or the relatively low value the cotton needed and had when cleaned (about 4–6%) to a higher moisture value found to be optimum for separation of the cotton lint from the cotton seed (about 8%).

Although the processes of these Bryant applications are quite successful in establishing a moisture content in the cotton fibers that causes the gin to do a much better job of ginning and produces longer and higher quality lint, it has been found that the moisture regain is lost or partly lost in the gin and in the lint cleaner. The conventional gin operates with one or more gin saws, each of which is doffed by a fast rotating brush or by an air blast, or by a combination of both. Even the fast rotating brush sucks air into the gin and operates somewhat as a fan directing the air onto the cotton lint to doff it from the gin saws. This air, whether it be an air blast generated from an external fan or the air sucked in by a doffing brush, produces a drying effect upon the cotton lint, taking away some or all of the moisture that had been put into the fibers prior to ginning. The same thing happens in the lint cleaner which uses a fast rotating doffer to doff the cotton batt from the cleaning drum. In both cases, the air involved in doffing the cotton is almost always of lower relative humidity than that which would allow moisture at about 8% to remain in the cotton. Also, since the fan or doffer raises the pressure of the air, it raises the temperature also, thereby reducing the relative humidity of the air still further. All of this has a drying effect upon the cotton lint.

In general, it has been known that cotton gives up moisture to this doffing air, and attempts have been made to raise the moisture content of the cotton in the gin and in the lint cleaner. These prior attempts have involved the addition of water by spraying or injection of steam into the air blast flues. These prior methods simply have not been successful in raising the relative humidity of the doffing air. In the first place, the relative humidity of the air at the point of humidification cannot be greater than 100% because water in the flues causes the cotton to stick to the sides of the flues and causes choke-ups. In the second place, the relative humidity of the air at the point of 100% humidification is much lower than 100% by the time the pressure and temperature of the air are changed when the air reaches the cotton lint. Another thing that makes these conventional moisturizing efforts unsuccessful is that the air requires a period of time for absorption of water vapor into its molecular structure. The water and steam injection methods that have been used do not give the air sufficient time to absorb the moisture, and the water is only thrown against the sides of the flues where it interferes with the conveying of cotton.

As it happens, moisturized cotton will not give up moisture to air if the relative humidity of the air is at the proper value. For example, cotton lint that has a moisture content of 8% will not give up nor absorb moisture in the presence of air that has a relative humidity of 70%. This invention provides a way to obtain air that has a relative humidity of 70%, or any other relative humidity that corresponds to the moisture content of cotton, to leave that moisture content intact. One of the principal features of this invention is the provision of a long tunnel for conveying blast air to the gin for doffing cotton from the gin saws. A fan at the entrance to the tunnel blows air at about 4000 feet per minute through the tunnel and this high speed air doffs the cotton from the gin saws. A fog of moisture is introduced into the tunnel near the fan, but on the pressure side of the fan. Therefore, the air that receives this moisture is already at its high pressure and high temperature so that the added moisture produces a relative humidity that will not be reduced by the blower. Furthermore, the moisture is put into the air near the entrance of the tunnel so that the air in traveling through the tunnel has time to absorb the moisture into its molecular structure, giving the air a true relative humidity that is high enough to prevent drying of the cotton lint.

The invention has other features. These include the addition of moisture to the air on the suction side of the fan which raises its relative humidity somewhat. Even though the relative humidity of this air is reduced considerably when it is sucked into the fan and raised in pressure and temperature, the water fog on the pressure side of the fan brings the relative humidity of the air up to the desired level. By moisturizing the air on the suction side of the fan, the burden upon the water fog on the pressure side of the fan is reduced.

In a modification of the invention, a heater is put at the tunnel entrance between the blower and the spray nozzles. This heater raises the temperature of the air and improves its ability to absorb moisture. This hotter air, which is at high pressure on the discharge side of the blower, then picks up moisture from the spray nozzles and holds the moisture at the desired humidity level.

The heater serves another purpose. Ordinarily, when cotton is doffed from the gin saw it scrapes against the blast air duct on its way to the lint flue and leaves cellulose deposits. Often these cellulose deposits build up and block the flow of cotton. This collection of cellulose deposits is halted automatically by the heated blast air which raises the temperature of the blast air duct and enables the scraping action of the cotton itself to remove the cellulose deposits.

Another feature of the invention is the control of the humidity of the air in the atmosphere surrounding the gin and lint cleaner that is likely to come into contact with the cotton. This includes raising the relative humidity of the atmospheric air around these mechanisms, particularly that air that is to be drawn into the apparatus by fans and doffers.

While the invention is directed principally toward the control of humidity of the air used to doff the cotton from the gin saws and the lint cleaning drums, its principles are also useful in other places in the gin plant where cotton is conveyed by blast air. In any of these places which have fans to blow cotton through ducts, water can be added on the pressure side of the fans to keep the relative humidity of the air high enough to prevent removal of moisture from the cotton. It is intended that this invention be broad enough to cover these additional applications of the principles of this invention.

All of the foregoing features and principles are objects of this invention, and there will be other objects that will occur from the description of the invention.

In the drawings:

FIGURE 1 is a schematic diagram of a gin plant that incorporates this invention, including a cotton cleaner, a cotton storage apparatus, a gin, and a lint cleaner, with various moisture supplies;

FIGURE 2 is a diagrammatic view of the gin;

FIGURE 3 is a diagrammatic view of a blast air moisturizer;

FIGURE 4 is a fragmentary diagrammatic view of a blast air moisturizer with a heater; and FIGURE 5 is a diagrammatic view of the lint cleaner.

Referring to FIGURE 1, which shows this invention schematically, there is a conventional modern high speed cotton cleaner 6, a conventional modern high speed gin 7, and a conventional lint condenser and cleaner 8. Field cotton which is dry, or which, in most climates is first dried to a moisture content of about 4%–5%, is fed into the cleaner 6 where most of the sticks, hulls and trash are removed. This cleaning works best if the cotton is not too wet. However, cleaned cotton from the cleaner 6 does not go directly to the gin 7. This cleaned cotton is sent through a mosturizer 9 having spray nozzles 10 or other suitable water or moisturizing chemical discharge apparatus. After the moisture has been added, the cotton is conveyed to one or more storage bins 11 where it is stored for about five to twenty minutes to allow absorption of the moisture into the cotton fibers. Then the cotton is returned to the high speed apparatus through a conveyor 12 that delivers the cotton to the gin 7. At this time the cotton has a moisture content of about 6%–9% which is optimum for ginning. This moisturizing and storing of cotton prior to ginning is described in detail in the aforementioned Bryant patent applications.

The cotton is carried automatically through the gin 7 and the lint cleaner 8 and is then ready for baling. Once the initial batch of cleaned cotton has been stored and directed to the gin 7, the over-all stream of cotton flow through the stages of cleaning, moisturizing, storing, ginning and lint cleaning is substantially continuous, or at least as continuous as the flow would normally be. There are always the short interruptions occurring between cotton loads when no cotton is being fed to the cleaner 6. These interruptions are desirable because they make it easier to distinguish between the cotton crops of different farmers.

Referring to FIGURE 2, the cleaned cotton enters the gin 7 and is transferred to one or more gin saws 13. The operation of the gin saws to separate the cotton lint from the cotton seed is conventional and is not described here. There is a conveyor 14 for carrying moats and other foreign material out of the gin housing, these moats and foreign material having been slung away from the fast rotating gin saw 13.

An air blast flue 15 leads to a nozzle 16 near the surface of the gin saw 13. The nozzle 16 is as wide as the gin saw 13 and directs air across the surface of the gin saw to doff cotton and direct the cotton to a flat duct 17. The duct 17 leads to a lint flue 18.

Any lint cleaner 8 may be used with this invention. It may have a condenser combined with it or housed separately. A typical lint condenser and cleaner 8 is shown in FIGURE 5. This condenser and cleaner 8 has an inlet flue 21 that is connected to the lint flue 18 to receive lint from the gin 7. The inlet flue 21 leads to a lint condenser drum 22 that forms a batt of the cotton lint as is known in the art. The batt of cotton lint is taken off the drum 22 by doffing rollers 23 and 24 that operate with a combing cylinder 25 to compress the batt and direct it to a saw cylinder 26. The saw cylinder 26 rotates past a plurality of grid bars 27 that knock extraneous material away from the lint and drop the extraneous into a trash chamber 28 from which it is removed by a belt or other trash conveyor 29.

A fast rotating brush drum 30 doffs the cotton from the saws 26. In normal operation, this fast rotating brush draws air into the vicinity of the saw 26 which helps doff the cotton and also creates a wind blast to convey the cotton through a duct 31 to a lint flue 32. Thereafter the cotton is carried either to subsequent lint cleaners like the lint cleaner 8 or to the baling machines (not shown).

As is conventional, the cotton can be made to bypass the lint cleaner and condenser 8. In FIGURE 5, there is a damper 33 between the inlet flue 21 and the outlet duct 31. When the damper 33 is moved to the dotted line position, the cleaner and condenser is blocked off and a direct path is established between the inlet flue 21 and the duct 31 leading to the lint flue 32.

FIGURE 3 shows the gin 7 schematically as a box and also shows that one or more similar gins 7' may be serviced by the same blast flue 15. These gins 7 and 7' may also be serviced by the same lint flue 18.

Some of the imortant features of this invention are also shown in FIGURE 3. A large tunnel 35 is connected to the air blast flue 15 to enlarge and extend the path through which the blast air must travel. At the entrance 36 to the tunnel 35 there is a blower 37 having a filter inlet 38 that allows air to be drawn from the atmosphere into the blower 37. The blower 37 supplies the blast air that emerges from the nozzle 16 to doff cotton from the gin saws. To doff effectively, the blast air normally travels through the flue 15. This air is blown at the rate of 4000–5000 feet per minute. The blast flue is about 15–20 inches in diameter.

The tunnel 35 may be horizontal, as illustrated, or vertical to save floor space. It should be quite large because one of its functions is to give the blast air enough time to absorb moisture. A satisfatory tunnel 35 has a diameter of about five feet and is about sixteen feet long. The effect of this large diameter is to greatly reduce the speed of the air while it is in the tunnel.

Near the inlet 36 there are several water nozzles 40 that constantly spray a water fog into the tunnel 35 whenever the blower 37 is operating. The amount of water introduced through the nozzle 40 can be regulated according to the humidity of air desired. Since the air is moving relatively slowly through the tunnel, it spends more time in the water spray area. The air picks up this water and carries it through the tunnel 35 while the water is absorbed into the molecular structure of the air, so that by the time the air reaches the blast nozzle 4, it is moist air that will not absorb moisture from cotton on the gin saw 13.

There may also be water nozzles 41 located at the filter inlet 38 to the blower 37. If these nozzles 41 are provided, they spray water onto the air on the suction side of the blower 37 raising its humidity somewhat. Then, when the blower 37 draws the air through the filter inlet 38 and blows it into the tunnel inlet 36, it raises the pressure and temperature of the air, thereby reducing its humidity. However, the nozzles 40 add additional moisture to the air raising its relative humidity to the desired level.

Usually the high velocity air stream emerging from the blast nozzle 16 creates a vacuum that sucks some air into the machine 7 from the surrounding atmosphere, drawing this atmospheric air into the flat duct 17 leading to the lint flue 18. Because of this, there are some additional spray nozzles 44 positioned in the vicinity of air around the machine 7 that is likely to be sucked into the machine. If the surrounding atmospheric air has a low relative humidity the spray nozzles 44 can be opened to moisturize this atmospheric air and raise its humidity. Otherwise, the surrounding atmospheric air tends to lower the relative humidity of the air in the duct 17 to a point at which it will absorb moisture from the cotton lint.

FIGURE 4 shows the tunnel 35 and the blower 37 of FIGURE 3, but with a heater 45 interposed between the blower and the tunnel. The heater 45 raises the temperature of the blown air which facilitates absorption by the air of moisture added by the nozzles 40. The heated air also heats the surface 46 of the blast air flue 15 adjacent the nozzle 16. When this portion of the air blast flue is unheated, the cotton lint which is blown off the gin saws 13 rubs past the surface 46 on its way to the duct 17 and leaves cellulose deposits on the surface 46. These cellulose deposits frequently build up to such a thickness that the machine must be shut down to clean the surface 46. It has been found that the heated air in the air blast flue 15 will sufficiently heat the surface 46 to aid in removal of this cellulose material by the brushing action of the cotton itself so that the surface 46 becomes self-cleaning.

In the lint cleaner 8, shown in FIGURE 5, the fast rotating brush 30 draws air from the surrounding atmosphere 50 into the machine 20. This atmospheric air, which has normally a relatively low humidity, tends to absorb moisture from the cotton lint. However, the present invention includes the provision of water nozzles 51 in the vicinity of the brush 30 at those locations where atmospheric air is sucked into the machine by the brush 30. These nozzles 51 add moisture to the atmospheric air to raise its relative humidity. The nozzles 51 may be supplemented by water nozzles located externally of the machine 8 to add moisture to the surrounding atmosphere before it even enters the machine 8.

In over-all operation, this system provides an effective control of the moisture content of the cotton and of the humidity of the air. The cleaner and the gin are allowed to perform their functions upon the cotton at different optimum moisture contents of the cotton. Subsequently, the air that contacts the cotton is humidity controlled to a level that leaves the moisture content of the cotton substantially intact. All of this is accomplished with substantially continuous operation of all of the machinery.

Various changes and modifications may be made within the purview of this invention as will be readily apparent to those skilled in the art. Such changes and modifications are within the scope and teaching of this invention as defined by the claims appended thereto.

What is claimed is:
1. A system for moisturizing cotton prior to separation of the cotton lint from the cotton seed and for controlling the moisture content of air thereafter contacting the cotton to prevent loss of the moisture to the air comprising a machine for separating the lint from the seed, an inlet to the machine, an outlet from the machine, means for adding moisture to cotton and means to store the cotton for a predetermined period of time prior to introducing the cotton into the inlet, said machine including a gin saw for separating the lint from the seed, a blower, a duct leading from the blower to a point adjacent the gin saw to deliver air from the blower to the point for doffing cotton from the gin saw, means to add moisture to the air on the discharge side of the blower and heater means between the discharge side of the blower and the moisture adding means to heat the air prior to adding moisture thereto.

2. The system of claim 1 wherein the duct has a chamber section, the chamber section being of much larger transverse area than that of the remainder of the duct, the chamber section having an air inlet adjacent the discharge side of the blower, and the moisture adding means being adjacent the inlet to the chamber section.

3. The system of claim 1 including means to clean the lint after separation thereof from the seed, and means to increase the moisture content of air in the cleaning means.

4. A system for moisturizing cotton prior to separation of the cotton lint from the cotton seed and for controlling the moisture content of air thereafter contacting the cotton to prevent loss of the moisture to the air comprising a machine for separating the lint from the seed, an inlet to the machine, an outlet from the machine, means for adding moisture to the cotton and means to store the cotton for a predetermined period of time prior to introducing the cotton into the inlet, said machine including a gin saw for separating the lint from the seed, a blower, a duct leading from the blower to a point adjacent the gin saw to deliver air from the blower to the point for doffing cotton from the gin saw, means to add moisture to the air on the discharge side of the blower, and means to add moisture to the air on the suction side of the blower.

References Cited by the Examiner
UNITED STATES PATENTS

| | | | |
|---|---|---|---|
| 700,347 | 5/1902 | Lumpkin | 19—66 X |
| 747,315 | 12/1903 | Brantley | 19—39 |
| 2,312,557 | 3/1943 | Joyce | 19—66 |
| 2,736,068 | 2/1956 | Lopez | 19—59 |
| 2,747,234 | 5/1956 | Speakes et al. | 19—66 |
| 2,815,536 | 12/1957 | Bryant | 19—66 |
| 2,815,537 | 12/1957 | Bryant | 19—66 |
| 3,114,938 | 12/1963 | Bryant | 19—66 |

DONALD W. PARKER, *Primary Examiner.*

D. NEWTON, *Assistant Examiner.*